United States Patent
Wang

(10) Patent No.: US 7,520,024 B2
(45) Date of Patent: Apr. 21, 2009

(54) HINGE ASSEMBLY

(75) Inventor: Ting-Hsien Wang, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 374 days.

(21) Appl. No.: 11/450,196

(22) Filed: Jun. 9, 2006

(65) Prior Publication Data

US 2007/0283533 A1 Dec. 13, 2007

(51) Int. Cl.
*E05D 11/10* (2006.01)

(52) U.S. Cl. .............................. 16/321; 16/319; 16/324

(58) Field of Classification Search .................. 16/321, 16/324, 326; 248/917, 918, 919, 922, 923, 248/278.1, 284.1; 361/752–759, 796–802, 361/681; 379/426, 427, 430, 433.11, 433.13, 379/450, 445, 443; 40/530, 606.15, 611.02
See application file for complete search history.

(56) References Cited

U.S. PATENT DOCUMENTS

| | | | | |
|---|---|---|---|---|
| 4,848,873 A | * | 7/1989 | Villar | ........................ 359/230 |
| 5,515,575 A | * | 5/1996 | Pinazza | ........................ 16/228 |
| 6,585,324 B2 | * | 7/2003 | Eppert et al. | .............. 297/463.1 |
| 6,659,559 B1 | * | 12/2003 | Metzler et al. | ......... 297/378.12 |
| 6,954,221 B2 | * | 10/2005 | Wu | ............................. 361/681 |
| 7,232,098 B2 | * | 6/2007 | Rawlings et al. | ............ 248/121 |
| 7,275,283 B2 | * | 10/2007 | Kistner et al. | ................. 16/286 |
| 2007/0006422 A1 | * | 1/2007 | Lu et al. | ....................... 16/337 |

* cited by examiner

*Primary Examiner*—Victor Batson
*Assistant Examiner*—Matthew Sullivan
(74) *Attorney, Agent, or Firm*—William E. Pelton, Esq.; Cooper & Dunham LLP

(57) ABSTRACT

A hinge assembly could be installed between a panel and a base of an LCD and has a body, an active leaf and two mounting leaves. The body has two sides and two protrusions formed on the two sides respectively. The active leaf has two mounting portions mounted pivotally with the mounting leaves respectively and each mounting portion has a retainer. The mounting leaves are mounted pivotally on the two sides of the body and each mounting leaf has a slide slot with a folding end and an active slot with a latching end. The slide slots hold the protrusions respectively and the active slots hold the retainers. When the protrusions reach the folding ends, the panel and the base is folded into a flat status and encasing or transporting of the LCD is convenient.

4 Claims, 8 Drawing Sheets

HINGE ASSEMBLY

BACKGROUND OF THE INVENTION

1. Field of the Invention

The present invention relates to a hinge, and more particular to a hinge assembly mounted between a panel and a base of a LCD and allowing the panel and the base to fold into a flat status to facilitate encasing and transporting.

2. Description of Related Art

An LCD (liquid crystal display) generally includes a panel, a base and a hinge. The hinge is typically mounted between the panel and the base to make the panel rotatable relative to the base for convenience of watching the panel.

When a LCD needs to be encased or transported, the panel and the base of the LCD is folded to reduce volume of the LCD, so that to encase and transport the LCD is convenient. However, the rotation angle of a conventional hinge is normally limited, so that the panel and the base may have an inevitable included angle between the panel and the base after folded, which enlarges the volume of the LCD and makes encasing and transporting more troublesome.

Moreover, the conventional hinges are not able to retain the position of the panel and the base after folded, such that the LCD may probably shake during encasing or transporting and are easily damaged.

To overcome the shortcomings, the present invention provides a hinge assembly to obviate or mitigate the aforementioned problems.

SUMMARY OF THE INVENTION

The main objective of the present invention is to provide a hinge assembly that can be mounted between a panel and a base and allows the panel and the base to fold completely flat, so as to reduce the volume of the LCD and make encasing and transporting the LCD convenient and uneasy to damage.

The hinge assembly in accordance with present invention mainly comprises a body, two mounting leaves and an active leaf.

The body is mounted with a base of an LCD and has two sides and two protrusions formed at the two sides respectively.

The mounting leaves are mounted with a panel of the LCD. Each mounting leaf is pivotally mounted on one side of the body to allow the rotation of the body relative to the base of the panel, each mounting leaf has a side surface, a slide slot and an active slot. The slide slot and the active slot are formed through the side surface and are crisscross with each other. Each slide slot holds one protrusion of the body and has a folding end. Each active slot has a latching end.

The active leaf has two sides mounted with the mounting leaves pivotally and respectively, the active leaf has two retainer formed on the two ends and received in the active slots respectively.

The protrusions may slide along the slide slots when the panel rotates relative to the base. When the protrusions reach the folding ends of the slide slots, the panel may fold into a flat status. After that, the active leaf can rotate relative to the mounting leaves to make the retainers stay in the latching ends of the active slots, so as to retain the protrusions in the folding ends of the slide slots, such that the panel and the base may keep folded stably.

Since the panel and the base can be folded, encasing and transporting of the LCD is convenient and uneasy to damage.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
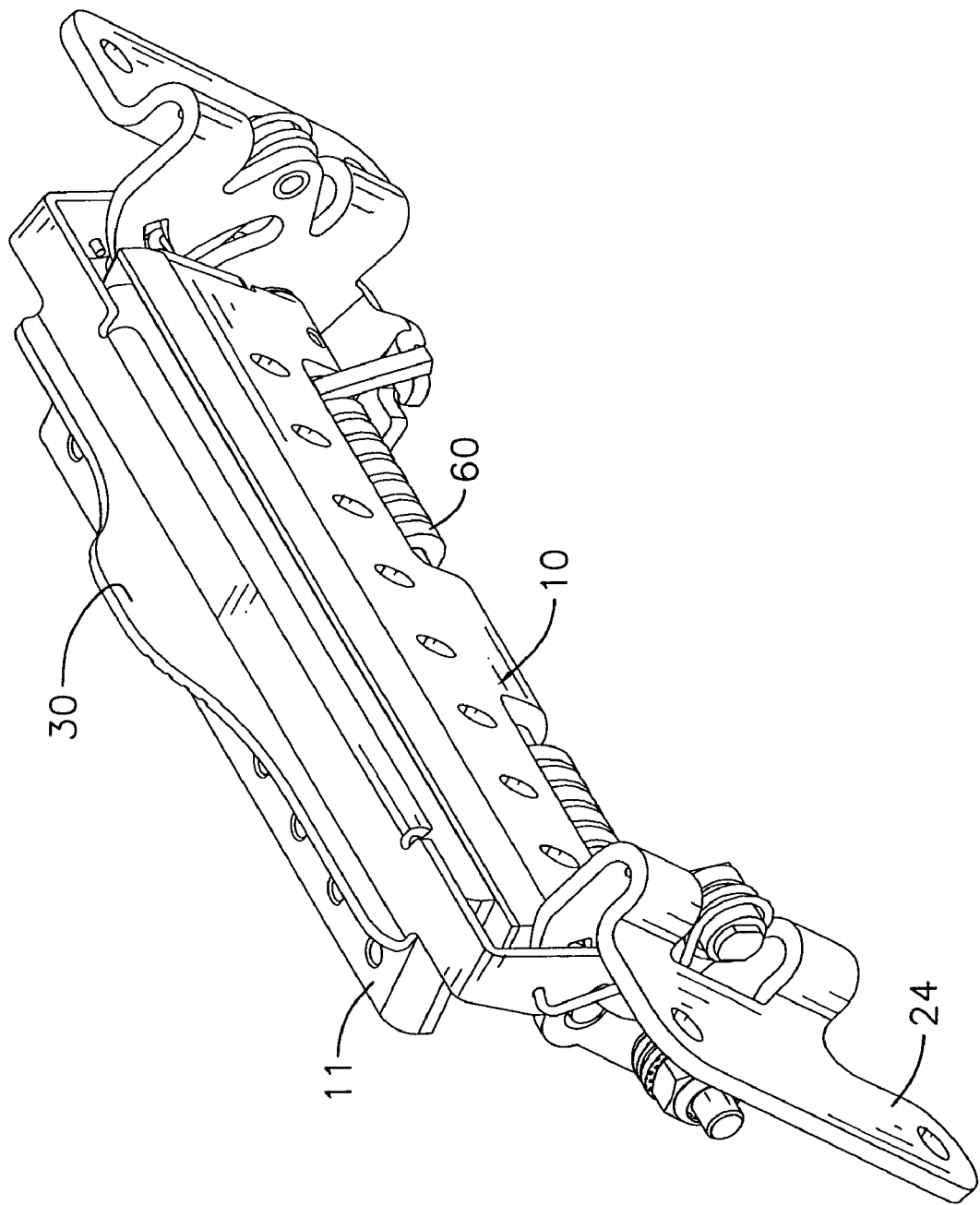
FIG. 1 is a perspective view of a hinge assembly in accordance with the present invention.
Figure 2:
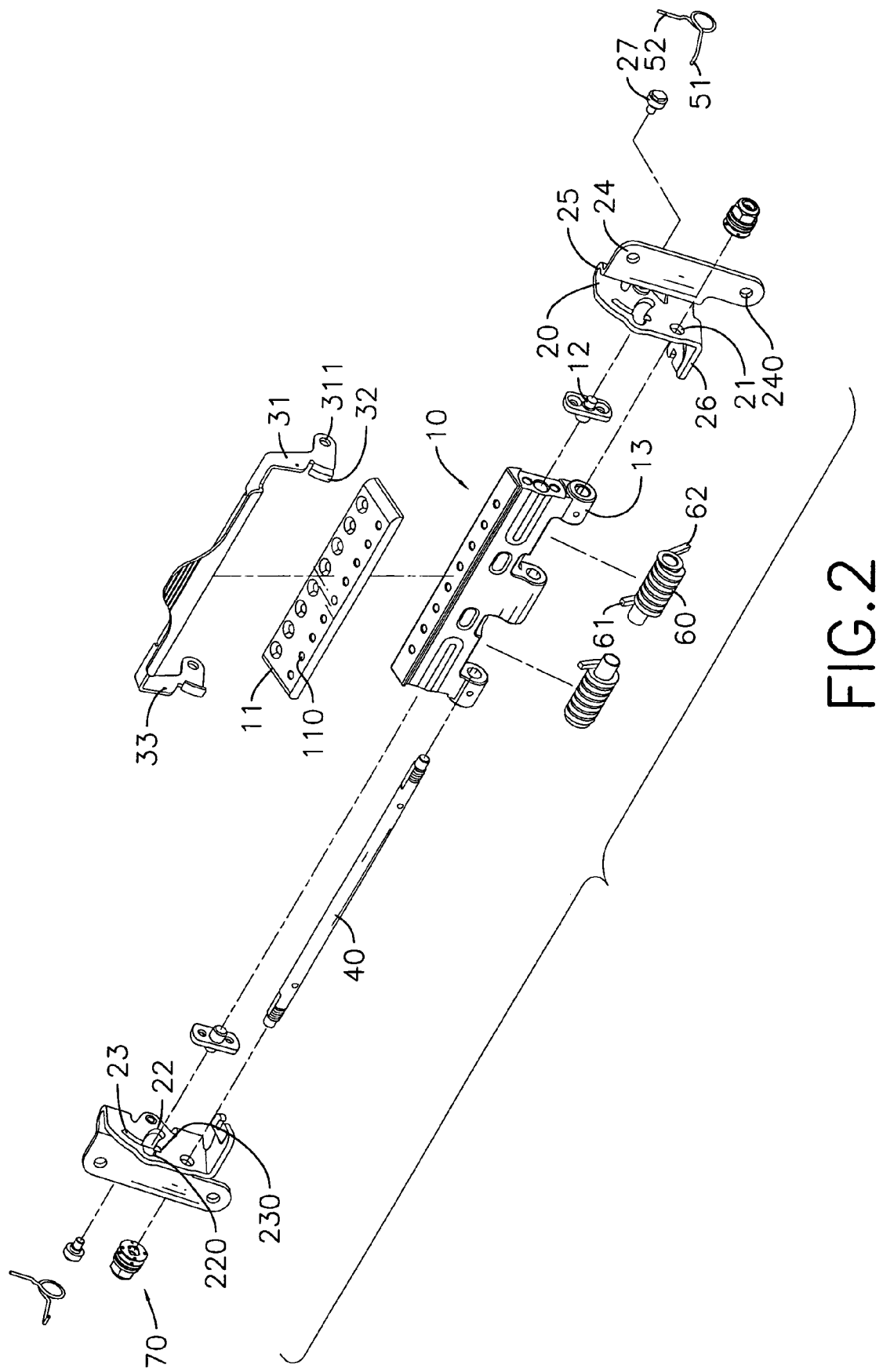
FIG. 2 is an exploded perspective view of the hinge assembly in FIG. 1.
Figure 3:
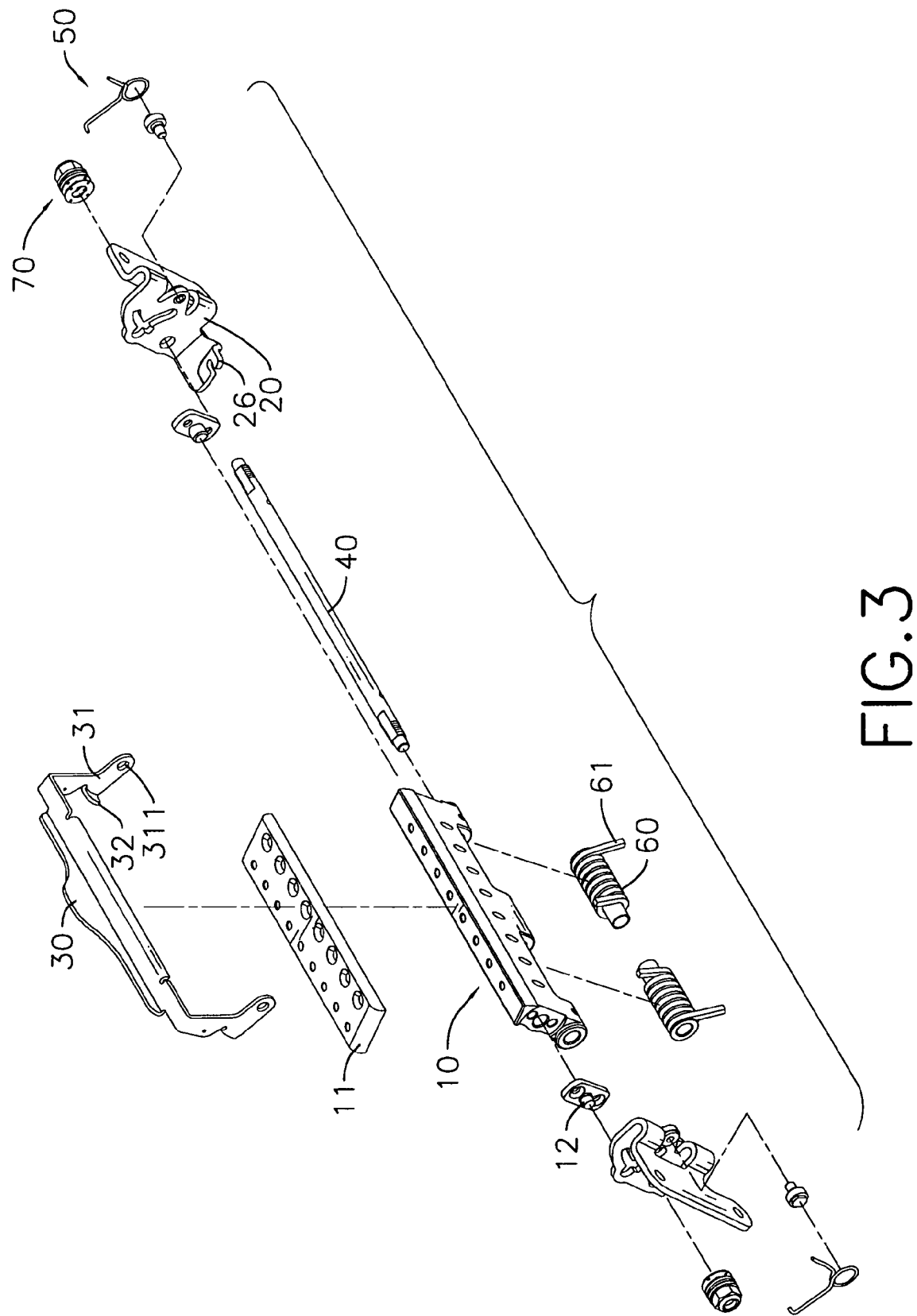
FIG. 3 is an another exploded perspective view of the hinge assembly in FIG. 1.

With reference to FIGS. 1, 2 and 3, the hinge assembly in accordance with the present invention comprises a body (10), two mounting leaves (20), an active leaf (30), two spring coils (60) and two resilient elements (50).

The body (10) has two sides, a top, a bottom, two protrusions (12), a mounting stage (11), three sleeves (13) and a pintle (40).

The protrusions (12) are mounted coaxially at the two sides of the body (10) respectively.

The mounting stage (11) is mounted on the top of the body (10) and has multiple through holes (110).

The three sleeves (13) are separately formed coaxially on the bottom of the body (10).

The pintle (40) extends through the sleeves (13) and has two non-circular ends protruding out from the sleeves (13).

The mounting leaves (20) are mounted on the two sides of the body (10). Each mounting leaf (20) has a bottom, a side surface, a non-circular hole (21), a spacer assembly (70), a flange (26), a slide slot (22), an active slot (23), a mounting tab (24) and a bending portion (25).

The non-circular holes (21) are formed respectively through the side surfaces of the mounting leaves (20). The non-circular holes (21) of the mounting leaves (20) respectively corresponds to and are mounted on the non-circular ends of the pintle (40).

The spacer assemblies (70) are mounted respectively on the non-circular ends of the pintle (40) to fasten the pintle (40) and the mounting leaves (20) and to provide a friction to hold the mounting leaves (20) when the mounting leaves (20) rotates relative to the body (10).

The flanges (26) are respectively formed perpendicularly on the bottoms of the mounting leaves (20).

The slide slots (22) are formed respectively through the side surfaces of the mounting leaves (20) and respectively receive the protrusions of the body (10). Each slide slot (22) has a folding end (220). The active slots are formed respectively through the side surfaces of the mounting leaves (20) and crisscross with the slide slots (22). Each active slot (23) has a latching end (230).

The mounting tabs (24) are respectively formed perpendicularly to the side surfaces of the mounting leaves (20) and have multiple through holes (240).

The bent portions (25) are U-shaped in cross section and are respectively formed between the side surfaces and the mounting tabs (24) of the mounting leaves (20) and each bent portion (25) has an inner surface.

The active leaf (30) is mounted on the top of the body (10) and has two mounting portions (31) and two fasteners (27).

Each mounting portion (31) has a surface, an aperture (33), a mounting hole (311) and a retainer (32). The aperture (33) and the mounting hole (311) are formed through the mounting portion (31). The retainer (32) of each mounting portion (31) protrudes from the surface of the mounting portion (31) and extends through the active slot (23) of each mounting leaf (20).

The fasteners (27) of the active leaf (30) are mounted through the mounting holes (311) of the mounting portions (31) and fix with the mounting leaves (20) respectively.

The spring coils (60) are mounted on the pintle (40) between the sleeves (13) of the body (10) and each have a first end (61) and a second end (62). The first ends (61) of the spring coils (60) are attached with the body (10). The second ends (62) of the spring coils (60) are attached with the flanges (26) of the mounting leaves (20) to push the mounting leaves (20) backward after the mounting leaves (20) rotate.

The resilient elements (50) are mounted on the mounting leaves (20) respectively and each resilient element (50) has a first end (52) and a second end (51). The first ends (52) of the resilient elements (50) attach to the inner surfaces of the bent portions (25). The second ends (51) are mounted respectively into the apertures (33) of the mounting portions (31) of the active leaf (30) to push the active leaf (30) to retain in a position where the retainers (32) are respectively in the latching ends (230) of the active slots (23) of the mounting leaves (20).

Figure 4:
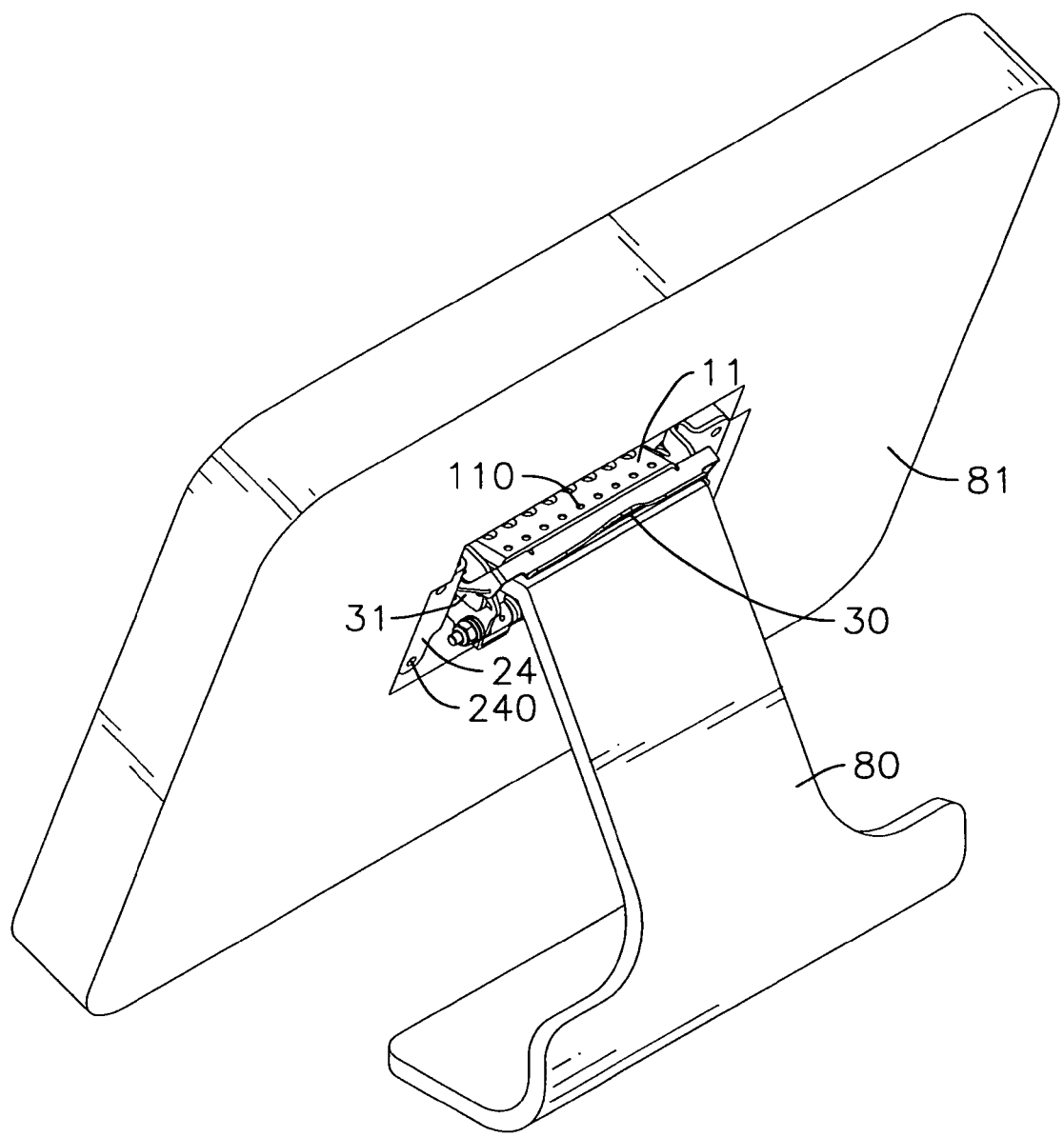
FIG. 4 is an operational perspective view of the hinge assembly in FIG. 1 being mounted in an LCD.
Figure 5:
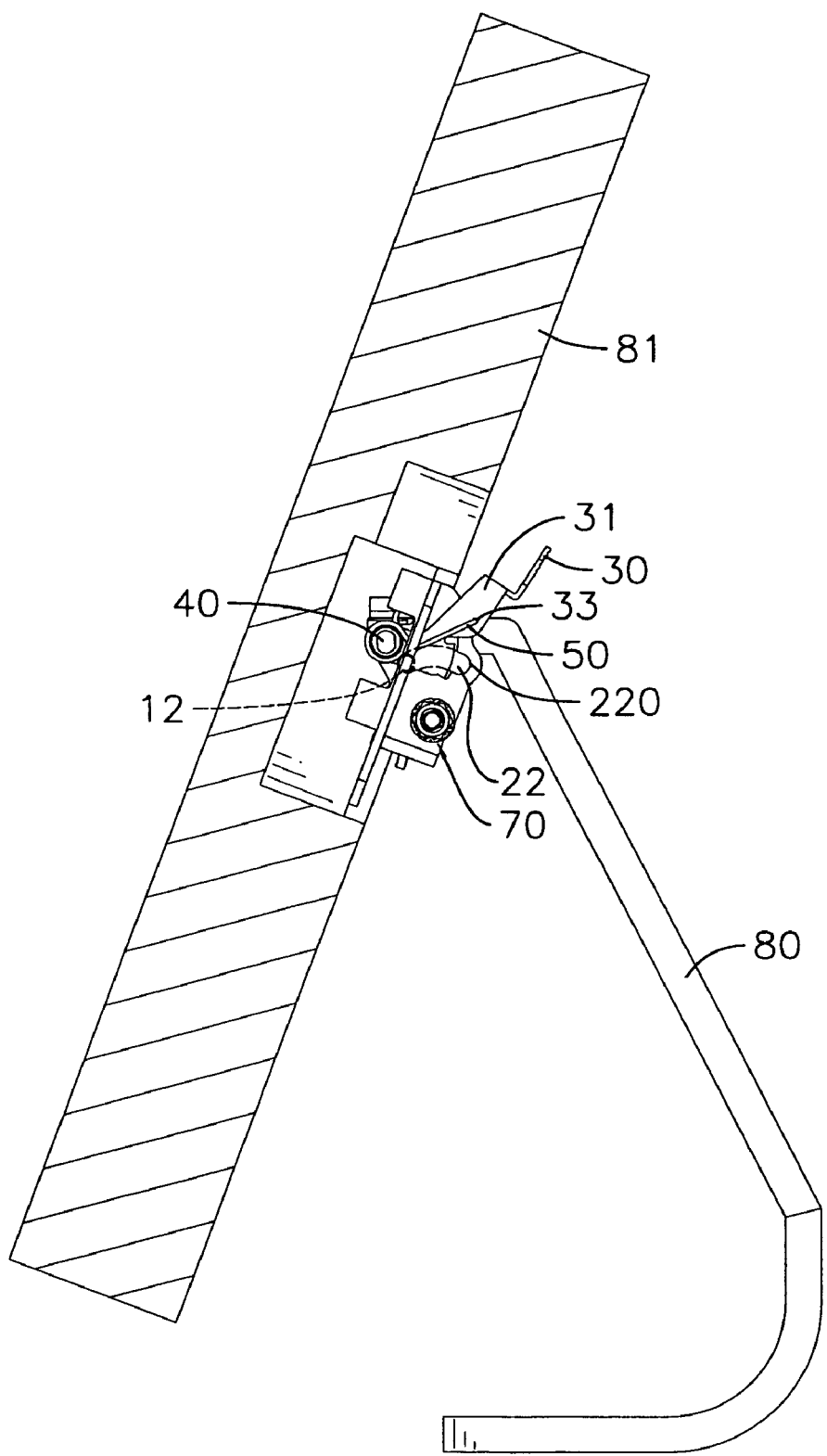
FIG. 5 is a side view in partial section of the LCD in FIG. 4 in an unfolded position.
Figure 6:
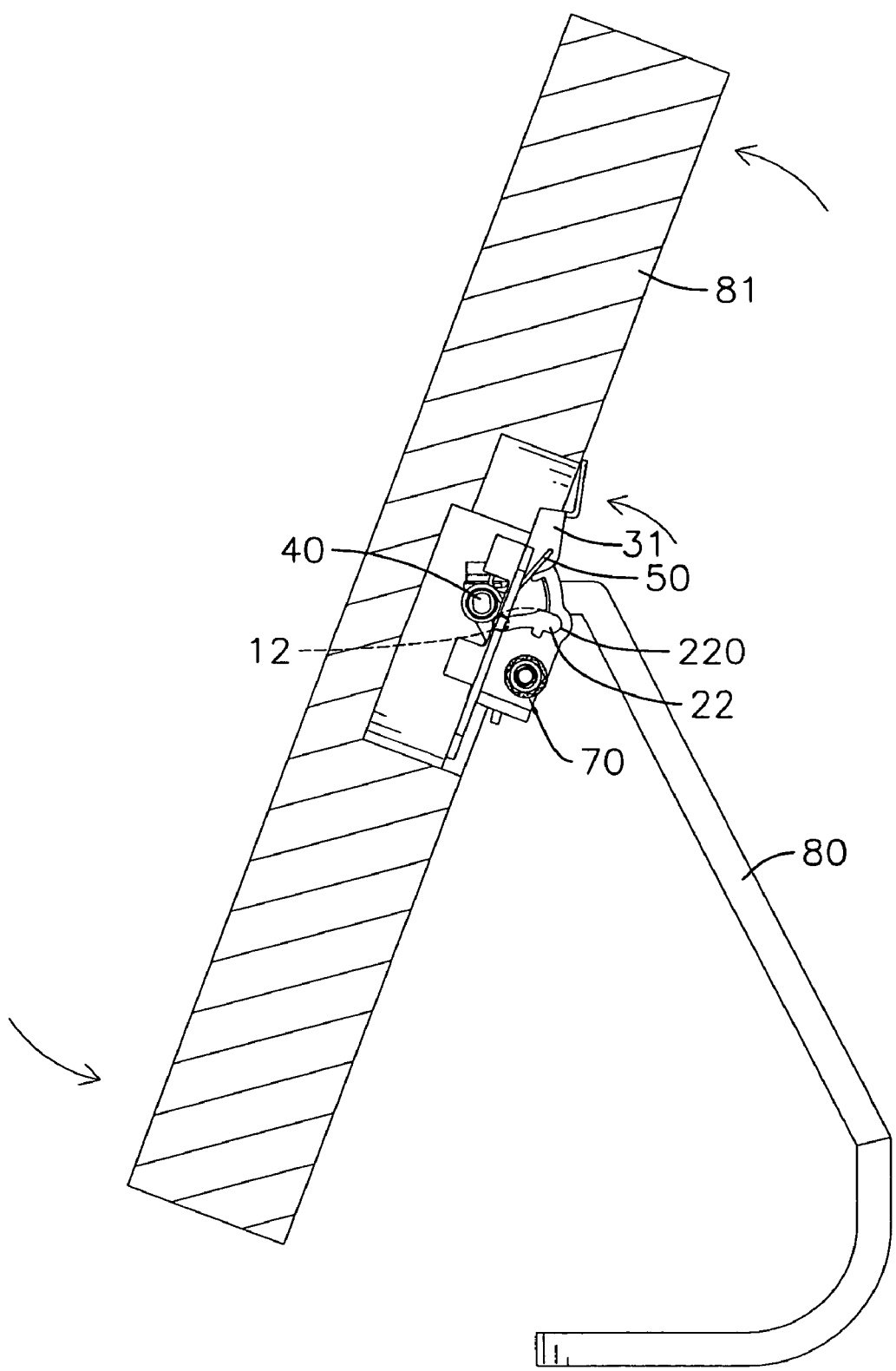
FIG. 6 is a side view in partial section of the LCD in FIG. 4 showing the panel rotating relative to the base.

With reference to FIGS. 4, 5 and 6, the hinge assembly in accordance with present invention can be mounted between a panel (81) and a base (80) of an LCD. When the panel (81) mounted with the mounting leaves (20) rotates relative to the base (80) mounted with the body (10), the protrusions (12) may slide along the slide slots (22). When the active leaf (30) is turned and the retainers (32) are removed from the latching ends (230) of the active slots (23), the protrusions (12) may slide close to the folding ends (220) of the slide slots (22) and the panel (81) may turn close to the base (80).

Figure 7:
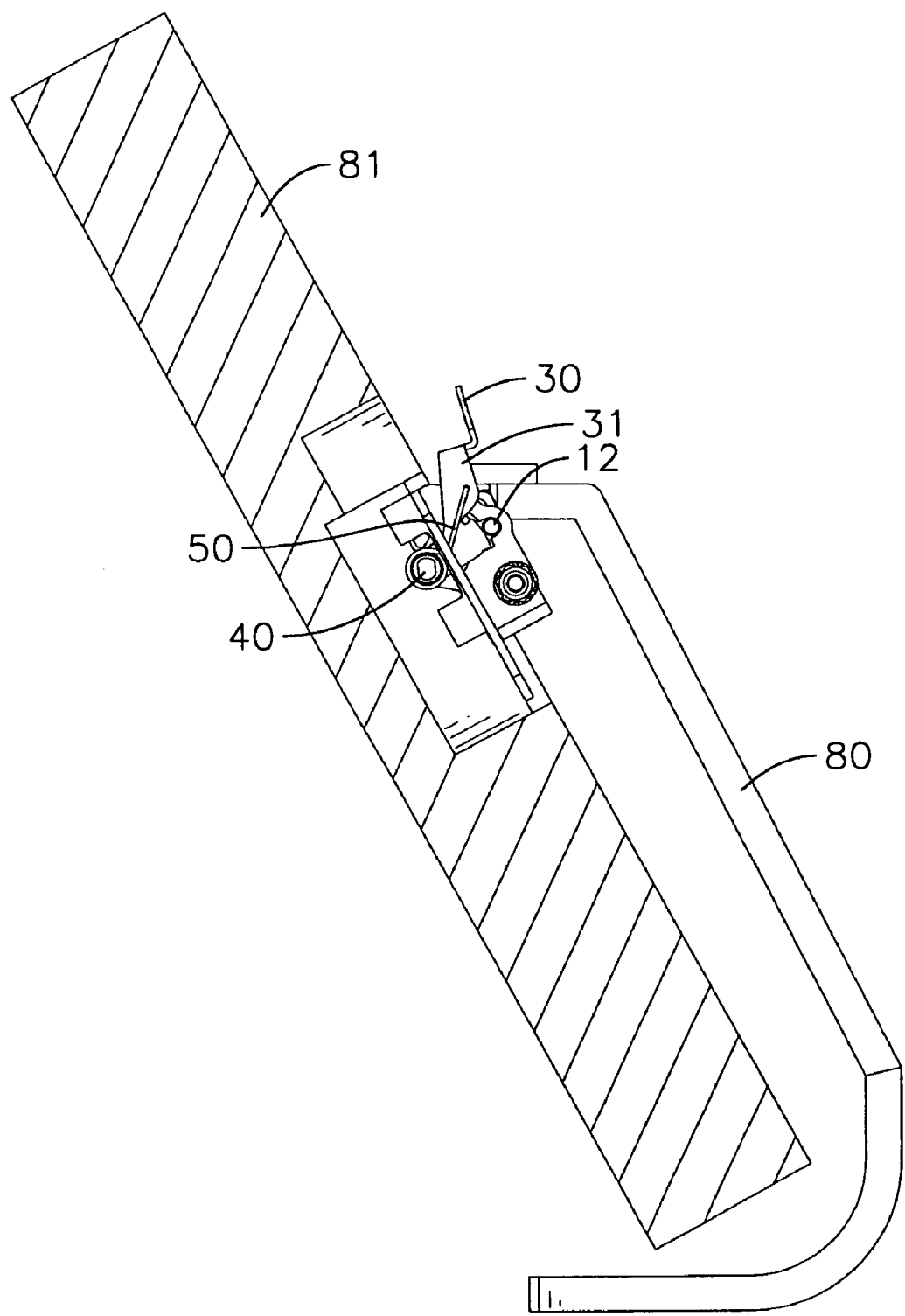
FIG. 7 is a side view in partial section of the LCD in FIG. 4 being folded into a flat status.

With reference to FIG. 7, when the protrusions (12) finally reach the folding ends (220) of the slide slots (22), the panel (81) and the base (80) are folded in a flat status.

Figure 8:
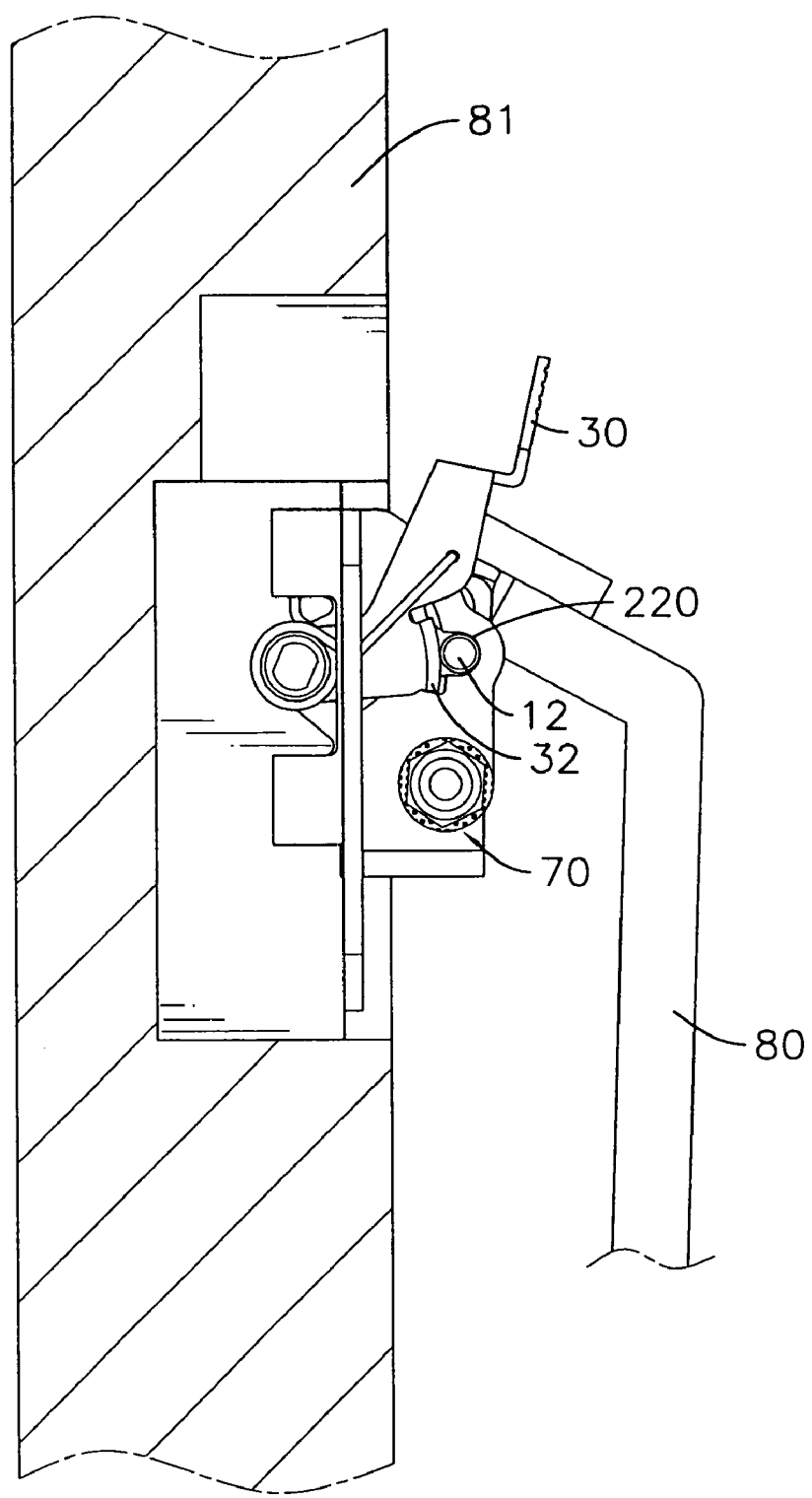
FIG. 8 is an enlarged side view in partial section of the LCD in FIG. 7 showing a protrusion being limited in the folding end of a slide slot by a retainer.

With further reference to FIG. 8, after the panel (81) and the base (80) are folded, the active leaf (30) can be pushed by the resilient element (50) to return. When the active leaf (30) is returned, the retainers (32) of the mounting portions (31) slide along the active slots (23) respectively at the same time and finally slide back to the latching ends (230) of the active slots (23) to limit the protrusions (12) in the folding ends (220) of the slide slots (22). As a result, the panel (81) and the base (80) are stably folded in a flat status, such that encasing and transporting of the LCD is convenient and uneasy to damage.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A hinge assembly comprising
   a body having
      two sides;
      a top;
      a bottom; and
      two protrusions being coaxially formed at the two sides respectively;
   two mounting leaves being mounted pivotally on the two sides of the body and each mounting leaf having
      a bottom;
      a side surface;
      a slide slot being formed through the side surface of the mounting leaf and receiving one of the protrusions of the body and having a folding end; and
      an active slot being formed through the side surface of the mounting leaf and having a latching end and being crisscross with the slide slot;
   an active leaf being capable of retaining in a position and having two mounting portions being mounted pivotally with the mounting leaves respectively and each mounting portion having
      a surface; and
      a retainer protruding from the surface of the mounting portion and extending through the active slot in a corresponding one of the mounting leaves and being in the latching end of the active slot; and
   two resilient elements being mounted respectively on the mounting leaves and each resilient element having
      a first end being attached to one of the mounting leaves; and
      a second end being connected to one of the mounting portions of the active leaf.

2. The hinge assembly as claimed in claim 1, wherein
   the body further comprise
      three sleeves being separately formed on the bottom of the body and having coaxial pivoting holes formed in the sleeves respectively; and
      a pintle extending through the pivoting holes of the sleeves and having two non-circular ends protruding out from the sleeves near the two sides of the body; and
   each mounting leaf further comprises
      a non-circular hole being formed through the side surface of the mounting leaf and corresponding and mounted to a corresponding one of the non-circular ends of the pintle; and
      a spacer assembly being mounted on the corresponding non-circular end of the pintle.

3. The hinge assembly as claimed in claim 2 further comprising two spring coils being mounted on the pintle between the sleeves of the body and each spring coil having
   a first end being attached with the body; and
   a second end being attached with one of the mounting leaves.

4. The hinge assembly as claimed in claim 3, wherein
   the body further comprises a mounting stage being mounted on the top of the body and having multiple through holes; and
   each of the mounting leaves further comprises a mounting tab being formed perpendicular to the side surface of the mounting leaf and having multiple through holes.

* * * * *

UNITED STATES PATENT AND TRADEMARK OFFICE
Certificate

Patent No. 7,520,024 B2

Patented: April 21, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Brett William Degner, Menlo Park, CA (US); John P. Ternus, Redwood City, CA (US); and Andrew Lauder, San Francisco, CA (US).

Signed and Sealed this Eighth Day of February 2011.

DAVID J. BAGNELL
*Supervisory Patent Examiner*
Art Unit 3672
Technology Center 3600